Figure 1:
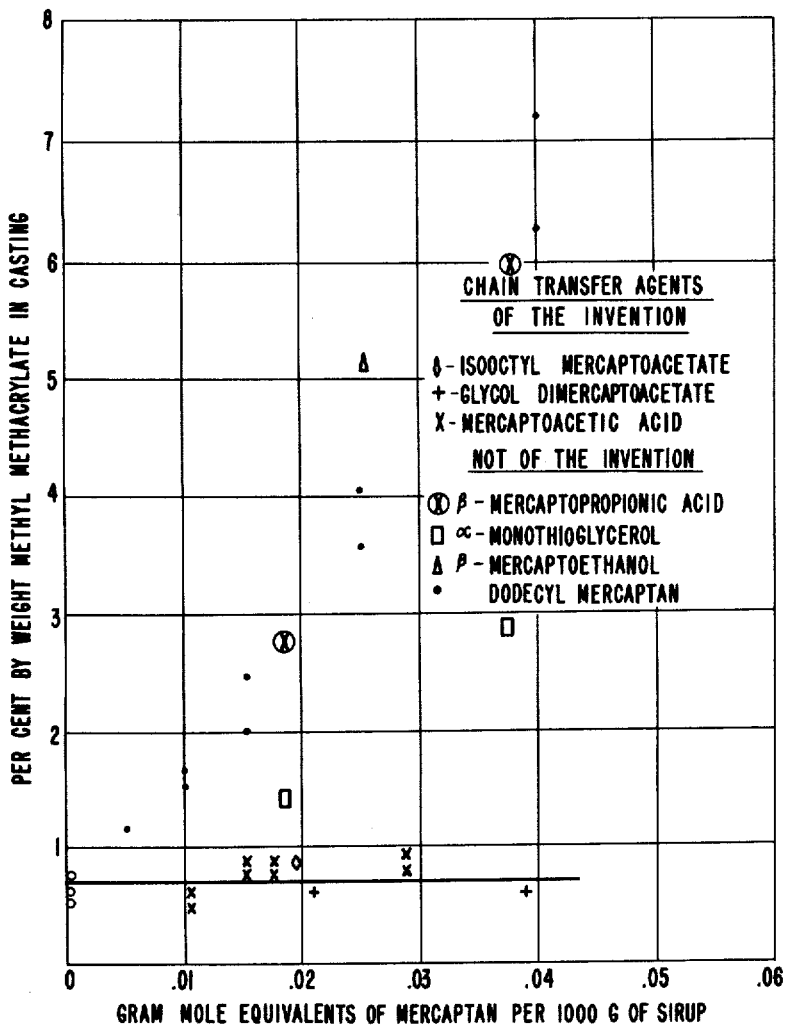

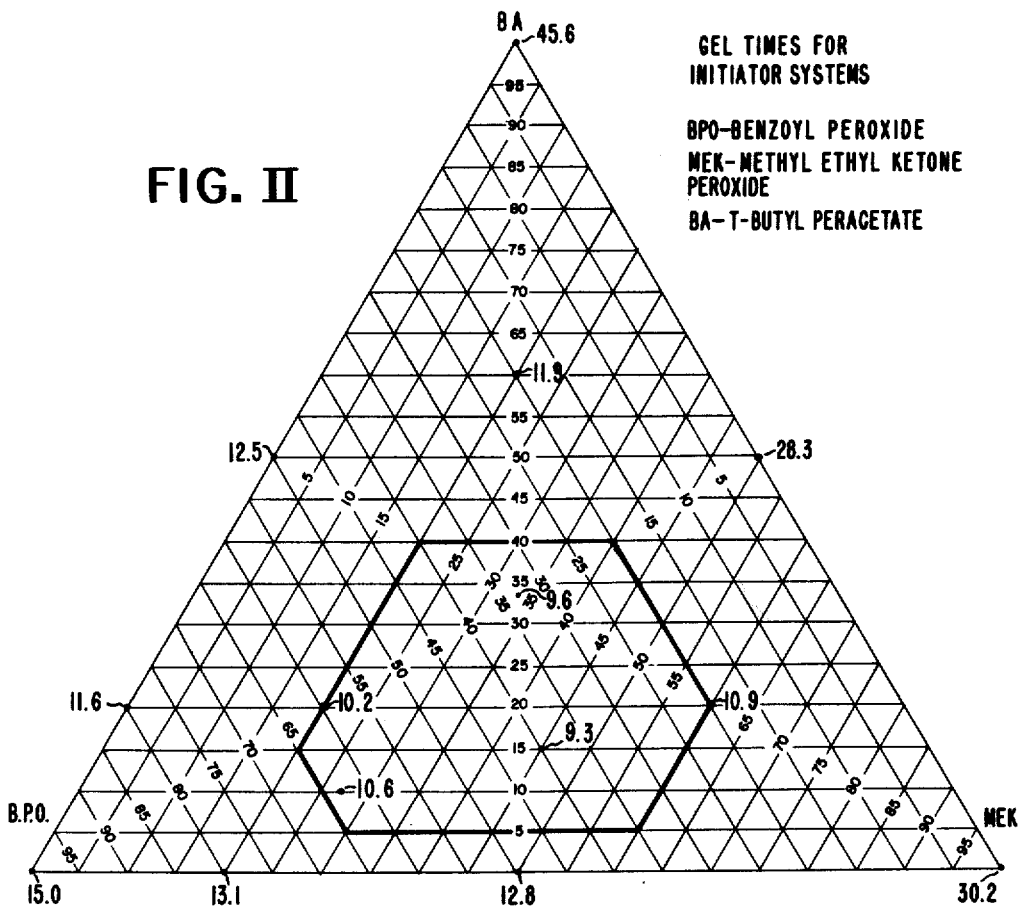

3,113,114
INITIATOR SYSTEMS FOR ACRYLIC POLYMERIZATIONS

Robert Allen Maginn and John William Van Dyk, Wilmington, Del., assignors to E. I. du Pont de Nemours and Company, Wilmington, Del., a corporation of Delaware
Filed Feb. 1, 1960, Ser. No. 6,041
2 Claims. (Cl. 252—426)

This invention relates to new compositions of matter containing partially polymerized methacrylates containing chain transfer agents suitable as laminating compositions and more particularly to initiators for monomer-polymer sirups of methacrylic ester compositions and processes for their use.

Prior to the present invention, no fully acrylate or methacrylate monomer-polymer sirup has been available to the fabricator that was stable, had a useful viscosity, and sufficiently high concentration of polymer and initiator activity such that it could be molded at a high rate to give, in the presence or absence of pigments, fillers, or the like, markedly improved laminate articles having superior weathering, stiffness, and craze-resistant properties. The invention provides such sirups and methods of using them.

Organic peroxides and mixtures of organic peroxides are known to effect the polymerization of unsaturated compounds. Prior experience has shown that when a mixture of two peroxides was used to effect the polymerization of a partially polymerized methacrylate, the effectiveness of the mixture was intermediate between the effectiveness of each of the components. This is best illustrated by an example: suppose that a tenth of a mole of initiator A causes 100 grams of a partially polymerized methacrylate sirup to polymerize to the extent that it is gelled in 10 minutes. Further suppose that a tenth of a mole of initiator B causes a partially polymerized methacrylate sirup to polymerize to the extent that it is gelled in 100 minutes, then one would expect that a mixture of 0.05 mole of initiator A and 0.05 mole of initiator B would cause 100 grams of a partially polymerized methacrylate sirup to polymerize to the extent that it had gelled at a time intermediate between 10 and 100 minutes. It has now surprisingly been found that certain mixtures of two or more peroxide initiators are more effective in producing polymerization than the individual components. This increased effectiveness or synergistic effect is the subject of this invention.

Objects of the present invention are to provide improved monomer-polymer sirups; a process for producing these sirups; and processes for their polymerization and products produced therefrom. Another object is to provide monomer-polymer sirups with relatively high concentrations of polymer of low inherent viscosity. Yet another object is to provide methacrylate compositions containing initiator systems to effect synergistically the polymerization of the ester at high rates. A further object is to provide monomer-polymer sirups of acrylic and methacrylic esters of relatively low exothermicity and shrinkage during final molding and polymerization. Another object is to provide chain transfer agents which produce laminates of low methacrylate monomer content. Still another object is to provide stable and flowable sirups of monomer and polymer-containing methacrylic acid esters and a process for molding, polymerizing and cross-linking the sirups in the presence of fibers, to weather-resistant articles. Other objects and advantages of the invention will appear hereinafter.

The invention relates to the preparation of polymer in monomer and copolymer in monomer sirups containing at least 10% by weight of polymeric methyl methacrylate, or a copolymer containing methyl methacrylate in monomeric methyl methacrylate that can be mixed with or absorbed by fibrous materials and thereafter molded, polymerized and cured to give weather-resistant articles containing at least 98% by weight polymerized. The sirups of the invention can, in accord with a feature of the invention, be made shelf-stable, have a flowable viscosity to permit easy use, a ratio of polymer to monomer to provide a minimum of shrinkage, and a minimum exotherm of polymerization, consistent with good physical properties of the product laminates. Moreover, the sirup can be polymerized to a product having superior weatherability, due to low monomer content, and at a high rate of polymerization because of the initiator system employed. Furthermore, the sirups of the invention contain crosslinking agents which produce fabricated plastic products on final polymerization that possess superior physical properties and surface qualities, and that are capable of being formed at the rapid rates demanded by modern industry to produce polymeric resins of low monomer content. A preferred embodiment of the invention can be more particularly characterized as involving the preparation of a methacrylate polymer or copolymer in methacrylate monomer as a sirup, containing 10 to 35% by weight of polymer that is markedly useful to impregnate fibers, fillers, and the like, the monomer content of the impregnated product being polymerizable at a rapid rate due to the use of the mercaptans described below which do not inhibit polymerization or curing of the last 10% of monomer and initiator systems also described below, which increase the rate of polymerization or curing of the last 10% of monomer. Moreover, the cured polymers of the invention contain less than 2% monomer content based on the weight of polymer.

Polymeric products of the invention are produced from sirups of partially polymerized methacrylates which contain a chain transfer agent having the following structures:

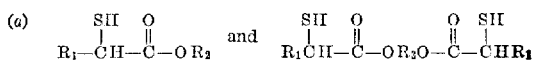

in which (b) $R_1$=hydrogen, alkyl, aryl, carboxymethyl, carboalkoxymethyl,
$R_2$=hydrogen, alkyl, aryl, alkoxyalkyl, alkoxyalkoxyalkyl, and
$R_3$=alkylene, polyalkylene, alkylene oxide and polyalkylene oxide.

The aforesaid chain transfer agents are unique in their ability (1) to regulate the molecular weight in the siruping stage of making polymer-in-monomer and copolymer-in-monomer sirups in order to produce sirups of high polymer content with relatively low viscosity and (2) not to inhibit the polymerization during the second stage of the process when the sirup is polymerized to a resin containing minimal amounts of monomer in comparatively short polymerization cycles, e.g., up to about 10 minutes for polymerization of the last 10% of monomer. Other chain transfer agents such as the allyl mercaptans, 2-mercaptoethanol, 2-mercaptopropionic acid, monothioglycerol, etc., if they satisfy requirement (1), fail in requirement (2), for the products, after the polymerization stage, contain more than the amount of monomer that can be tolerated.

The systems of the invention contain at least two polymerization initiators. Examples of such systems which exhibit a synergistic effect for polymerizing acrylic and alkacrylic acids and esters, and especially partially polymerized methacrylate, are benzoyl peroxide and p-menthane hydroperoxide, benzoyl peroxide and cumene hydroperoxide, benzoyl peroxide and methyl ethyl ketone peroxide, benzoyl peroxide and tertiary butyl peracetate, lauroyl peroxide and methyl ethyl ketone peroxide, and lauroyl peroxide and cumene hydroperoxide. Ternary mixtures include, for example, benzoyl peroxide, methyl ethyl ketone peroxide and tertiary butyl peracetate.

The synergistic effect of these systems is readily appreciated upon reference to the drawing, FIG. II, which is a triangular graph on which are plotted the percent tertiary butyl peracetate—as the coordinate forming the third side of the triangle having BA as the angle opposite the third side; benzoyl peroxide—as the coordinate forming the third side of the equilateral triangle having B.P.O. as the angle opposite the third side; and methyl ethyl ketone peroxide—as the coordinate forming the third side of the equilateral triangle having M.E.K. as the angle opposite the third side. Values of various combinations were determined by measuring gelation times, at 77° C., of these initiators at a 1% benzoyl peroxide equivalent for polymerization as described in detail below. It will be noted that 50/50 combination of the initiators is superior to either of the initiators above. For example, benzoyl peroxide alone gave a gelation time of 15 minutes and tertiary butyl peracetate, a gelation time of 45.6 minutes. Used together, however, benzoyl peroxide/tertiary butyl peracetate 80/20 and 50/50, the gelation time was reduced to 11.6 and 12.5 minutes, respectively, considerably less than either initiator alone.

Three component compositions, however, exhibited even more surprising effect, particularly within the range of 20 to 65% benzoyl peroxide, 20 to 60% methyl ethyl ketone peroxide and 5 to 40% tertiary butyl peracetate. Within this zone of maximum effect, an initiator peak activity was obtained, with an initiator containing 15% tertiary butyl peracetate; 40% benzoyl peroxide; and 45% methyl ethyl ketone peroxide, of 9.3 minutes.

Monomer-polymer sirups of the invention are made from any suitable polymerizable organic compound containing alkyl acrylates, alkyl methacrylates, etc., and more especially from the methacrylic esters such as methyl methacrylate. Methyl methacrylate may be used with other polymerizable vinyl compounds such as the ethyl acrylates and the like, in which use the methyl methacrylate constitutes at least 50% by weight of the resin content of the composition used. Such comonomers can be chosen to modify properties of the sirup and product laminates. Care should be exercised in the choice of comonomer so as not to affect adversely weatherability, heat resistance, stability, etc.

The sirups of the invention are distinguished from monomer-polymer solutions of the art in the following respects:

(a) The inherent viscosity (a measure of molecular weight) of the polymer portion of the sirup which is selected high enough to insure good physical properties of the product laminates but low enough to allow use of relatively high polymer content with resultant low shrinkage and exothermicity, thereby enabling and facilitating fabrication into reinforced plastic structures;

(b) The presence of the carbonyl-substituted mercaptans insures rapid polymerization in the final stage of the process to end-use products containing reduced monomer content; and (c) The presence of 0.1 to 20.0% of a divinyl compound (such as ethylene dimethacrylate) which improves the physical properties of the product laminates while at the same time increasing the speed of cure and thereby improving the ease and economics of fabrication.

(d) This last distinguishing property of the sirup constitutes an alternative feature of the invention; excellent storage stability of the sirup is attained from extremely low residual initiator content and the presence of only faint traces of polymerization inhibitors.

Prior art monomer-polymer sirups have been made by partially polymerizing methyl methacrylate without the use of transfer agents or due regard for the proper type and quantity of initiator or siruping time and temperature thus leading to sirups which on the one hand were not storable or shippable, as is usually required in the laminating industry, or on the other, were polymerized in the presence of chain transfer agents that inhibited polymerization. Alternatively, they have been made by dissolving commercially-available, fully-polymerized acrylic polymers in methyl methacrylate monomer to produce sirups of suitable viscosity. These commercial polymers are expensive and of inherent viscosity (0.44–2.0) such that only a limited concentration of polymer could be used, thereby resulting in sirups of relatively high shrinkage and exothermicity.

The sirups of the present invention having bulk viscosities in the range of 0.5 to 50 poises constitute balanced formulae containing polymers of low inherent viscosity, 0.25 to 1.0, and preferably 0.30 to 0.55, and with correspondingly high polymer content and suitable quantities of crosslinking agents to provide optimum physical properties and desirable curing characteristics. The inherent viscosity is determined at 20° C. in chloroform solution at a concentration of 0.50 gram/100 ml. according to the method described in F. W. Billmeyer, Textbook of Polymer Chemistry, Interscience Publishing Inc. (1957) p. 128.

The sirup of the invention may be prepared by any suitable process such, for example, as by partially polymerizing monomer (i.e. methyl methacrylate) by a process that will produce the prescribed polymer or by dissolving the described amount of polymer having the prescribed inherent viscosity in the monomer. Forming the polymer, in situ, is the preferred method. By such a method, a chain transfer agent of the invention is present during polymerization of the methyl methacrylate. The reaction should be catalyzed, moreover, with only sufficient polymerization initiator to produce the desired amount of polymer if a sirup of superior storage stability is desired.

The prepared sirup, for use in molding and in the preparation of laminate articles containing fibers, fillers and the like, has a viscosity in poises, at 25° C., of 50 or less and preferably between 2 and 15. The preparation of such a sirup necessarily involves the use of the aforesaid low viscosity polymer, either formed in situ or by solution, dissolved in sufficient amounts of monomer as described hereinabove, that sirup giving on polymerization a composition having not only a low shrinkage and exothermicity acceptable to the fabricator but also a laminate article having superior properties.

The sirup is preferably made by heating a small amount of a polymerization initiator in solution in an inhibitor-free acrylic or methacrylic ester in the presence of the chain transfer agent of the invention at suitable pressure and temperature until the solution has reached a predetermined viscosity, thereafter the hot solution is quenched by the addition of cold monomer containing a polymerization inhibitor. More specifically, a sirup having a viscosity between about 0.5 and 50 poises at 25° C. and preferably between 2 and 15 poises at that temperature, can be produced from methyl methacrylate by heating monomeric methyl methacrylate in a stirred jacketed kettle under reflux, at atmospheric pressure in the presence of a predetermined small amount of initiator and from 0.05 to 1.0 mole percent, and preferably from 0.1 to 0.4 mole percent of the chain transfer agent. This solution is heated at a temperature between 50 and 150° C. and preferably 95° C. to 105° C., until the predetermined viscosity of the solution has been attained and until the initiator content has been reduced to below 20 p.p.m. The polymerization is then stopped by cooling in any suitable manner, as for example and preferably, by the addition of from 1 to 10 percent by weight of cold methyl methacrylate containing sufficient hydroquinone to inhibit completely the polymerization of the methyl methacrylate.

The sirup as thus prepared has a long storage life because the initiator used is substantially all consumed to leave no more than about 20 p.p.m. of initiator after polymerization, and this small amount is not effective as an initiator for the reaction because of the presence of the polymerization inhibitor.

The stable sirup is an article of commerce that is sold to fabricators for use in their molding operations. The fabricator mixes the stable sirup with the hereinafter described polymerization initiator, and preferably a filler, and subjects the resulting mixture (or sirup if no filler is added) to a molding operation in which the sirup is converted to a solid shape simultaneously with the polymerization of its monomer content.

Sirups of the invention, if they are to be polymerized shortly after formation, can be made with or without extensive shelf-life stability. The advantages of the use of the chain transfer agents of the invention are not materially influenced by the degree of stability of the sirup.

Sirups of the invention reduce difficulties during shaping, due to comparatively low monomer content of the sirup. This results in low exothermicity during shaping and polymerization, in contrast with prior art sirups. The reduced exothermicity makes it possible to process parts rapidly and without blemishes, such as bubbles, flow lines, etc.

Another alternate feature of the invention relates to the presence of a crosslinking agent more fully characterized hereinafter. This agent improves the fabricability, physical properties, and weathering of the molded product, particularly when fibrous reinforcement is present.

The examples which immediately follow describe preferred methods for making the sirup in which parts are by weight unless otherwise noted.

EXAMPLE I

A stirred, water-jacketed kettle provided with a reflux condenser was charged with 1000 parts of inhibitor-free, monomeric methyl methacrylate and about 1.8 parts of mercaptoacetic acid. The resulting solution was heated to 80° C.±1° C. and then 0.30 part of alpha,alpha'azobisisobutyronitrile dissolved in 5.0 parts of methyl methacrylate added. The jacket temperature was adjusted to 100° C.±1° C. and the kettle contents were allowed to reach reflux temperature, ca. 103° C. Samples were taken periodically from the reaction mixture and measured for viscosity. When the viscosity reached about 10 poises (on a sample cooled to 25° C.), the reaction was quenched by the addition of a 25° C. solution containing 0.038 part of hydroquinone dissolved in 80.0 parts of methyl methacrylate. This point was reached in about 40 minutes after addition of the initiator.

The resulting sirup contained no detectable initiator, had a viscosity of about 10 poises at 25° C., had a polymer content of about 30%, an inherent viscosity of about 0.40, and a good shelf stability, i.e., substantially no color change or viscosity change after 30 days.

EXAMPLE II

The process of Example I was repeated for the preparation of a sirup with these changes: 3.3 parts of glycol dimercapto acetate replaced mercaptoacetic acid and the sirup contained 31.0% methyl methacrylate polymer having an inherent viscosity of 0.37.

EXAMPLE III

The process of Example 1 was repeated for the preparation of sirup with these changes: 3.6 parts of dodecyl mercaptan replaced the mercaptoacetic acid and the sirup had an inherent viscosity of 0.42. This sirup also had good shelf-stability with little detectable color change vs. viscosity change in 30 days.

In the table which follows, sheets formed from the sirups of Examples I, II and III are compared for monomer content. The percent methyl methacrylate monomer remaining in the sheets after various intervals in the press are shown in the table.

Table A

| Min. in Press at 115° C. | Percent Methyl Methacrylate Monomer Remaining in Sheet | | |
|---|---|---|---|
| | Example I—Mercaptoacetic Acid | Example II—Glycol dimercapto acetate | Example III—Dodecyl Mercaptan |
| 4 | 1.6 | 0.9 | |
| 5 | 1.2 | 0.7 | 3.7–4.1 |
| 7 | 0.8 | 0.6 | 2.0–2.4 |
| 10 | 0.7 | | 1.7–2.0 |

2-mercaptoethanol, monothioglycerol and 2-mercaptopropionic acid substantially duplicate the results of dodecyl mercaptan in their retardation of polymerization of the last 10% of monomer.

EXAMPLE IV

Sirups were prepared consisting of 28–32% methyl methacrylate polymer dissolved in methyl methacrylate monomer and containing about 0.04 mole of the chain transfer agent per 1000 g. of sirup. Benzoyl peroxide, 0.85%, was dissolved in the sirup and the resulting mixture was heated in a press for 7 minutes at 115° C. forming a sheet 0.070 to 0.100 inch in thickness. The percent methyl methacrylate monomer in this sheet was determined to measure the completeness of the polymerization reaction. The lower content of methyl methacrylate monomer in the sheets fabricated from sirup containing the substituted mercaptans (isooctyl mercaptoacetate, glycol dimercaptoacetate, and mercaptoacetic acid) is compared to that of sheets fabricated from sirup containing the mercaptan ($\beta$-mercaptopropionic acid, $\alpha$-monothioglycerol, $\beta$-mercaptoethanol, and dodecyl mercaptan), are shown in FIGURE 1.

Any suitable free-radical polymerization initiator may be used, such as a peroxygen intiator, e.g., benzoyl peroxide, diethyl peroxide, diisobutyl peroxide; the azo initiators of the Hunt USP 2,471,959, issued May 31, 1949, and the like, or the initiator systems of the invention. To produce a sirup, only part of the methyl methacrylate is polymerized. The initiators present in the sirup after polymerization will, even at or below room temperature, and at a slow rate, continue polymerization. Sirup which contains initiator is potentially viscosity-unstable. If a storable sirup is to be made, no more than small amounts of the initiator should be used, therefore, to insure that, when quenched, there is insufficient initiator remaining to cause undesirable polymerization.

Two factors govern the choice of conditions for a practical polymerization cycle. The conditions must be such that the polymerization rate is fast enough to be economically attractive, and secondly, the conditions must be such that the initiator is almost completely reacted. The polymerization rate can be calculated from the initiator concentration and temperature by equations well known in the chemical literature (see P. J. Flory, Principles of Polymer Chemistry, Cornell University Press (1953) p. 114). The approximate amount of initiator which can be added to the polymerization system and still not have too much remaining after siruping can be calculated in accordance with the formula $X=10^{-3}.2^{Pt/H}$, where X is the weight percent of initiator added prior to polymerization, H is the half-life of the initiator, and Pt is the polymerization time. (Any acceptable method for measuring the half-life of the initiator can be used, such as that described in the chemical literature, or that of Arthur W. Barry et al., application S.N. 614,824 filed October 9, 1956.)

A chain transfer agent to the extent of from 0.01 to 1.0 mole percent is used to control polymerization and give a polymer having the prescribed inherent viscosity. A sirup containing such polymers can be quenched quickly to stop the polymerization at the desired amount.

The quenching liquid used is a monomer of the ester being polymerized in which a suitable inhibitor for vinyl polymerization has been dissolved to the extent of preferably 10 to 100 parts per million parts of the sirup. Examples of such initiators are hydroquinone, the catechols, the pyrocatechols and other known inhibitors which are soluble in the monomer. The liquid solution containing .001 to 1% by weight of inhibitors at a temperature between 0 and 30° C. is added to the polymerizing sirup. This amount of inhibitor in cold monomer is sufficient in combination with cooling water in the jacket of the polymerization kettle to stop polymerization of the low molecular weight acrylic sirups, by reducing the temperature of the kettle contents to about 60° C. or lower.

The viscosity of the sirup can be measured by any standard method such as Gardner tube, Brookfield Viscosimeter, or the like. In the specification and claims, the viscosity given was measured by comparison with standard viscosity samples in Gardner viscosity tubes.

The cross-linking agent is added to the sirup in amounts up to 20% by weight after the quenching is completed. Any suitable poly-unsaturated, cross-linking agent may be used, such, for example, as ethylene dimethacrylate, propylene dimethacrylate, polyethylene glycol dimethacrylate, divinyl benzene, triallyl cyanurate, and diallyl phthalate.

If desired, a portion, i.e., up to about 2% of the cross-linking agent may be added to the sirup prior to quenching.

The sirups, just prior to or simultaneously with the fiber reinforcing or laminating step, are combined with the initiator systems of the invention. The initiator systems may be incorporated in the sirups by any suitable process. In order to insure thorough mixing, the systems are preferably added to the sirup from a concentrate of the initiator in sirup, the concentrate being thoroughly incorporated into the main sirup by any suitable means.

The unexplained ability of initiator systems of the invention to speed up the polymerization of the acrylic, alkacrylic and preferably the methacrylic acid ester monomers, per se, or in sirups, is illustrated in the following tables. The tables give examples of the invention in which all parts and percentages used are by weight unless otherwise stated. The data of the tables record gel times of polymerizing partially polymerized methyl methacrylate compositions prepared as follows:

Methyl methacrylate polymer, 1000 grams, in monomer sirup containing 30% polymeric methyl methacrylate, 1.25% ethylene dimethacrylate and 35 parts per million of hydroquinone was mixed with 20 grams of initiator, e.g., benzoyl peroxide. The resultant mixture contained 0.126% peroxidic oxygen as benzoyl peroxide. Herein the peroxidic oxygen content of the initiator designates the oxygen content that corresponds to the underlined oxygen in this formula of benzoyl peroxide—

$$(C_6H_5CO)_2O\text{—}\underline{O}$$

A portion of this mixture was poured into a 150 by 18 mm. test tube to give a 2″ thick layer. The gel time of the mixture in the test tube was measured in a gel time meter obtained from the Sunshine Scientific Instrument Co., Philadelphia, Pa. This instrument is a standard commercial instrument used to measure incipient gellation of thermosetting resins.

Table I

| Composition of Initiator and Initiator Systems | O, Percent [1] | Gel Time—Minutes | |
|---|---|---|---|
| | | At 40° C. | At 61° C. |
| 1. Benzoyl peroxide | 0.126 | 57.9 | 14.6 |
| 2. {Benzoyl peroxide | 0.063 | 30 | 12 |
|    {Methyl ethyl ketone peroxide | 0.063 | | |
| 3. Methyl ethyl ketone peroxide | 0.126 | >250 | 113.3 |
| 4. Lauroyl peroxide | 0.126 | 82 | 14.8 |
| 5. {Lauroyl peroxide | .063 | 57.7 | 18.1 |
|    {Methyl ethyl ketone peroxide | .063 | | |

[1] Expressed as concentration of peroxidic oxygen—see below.

Table II

| Initiator(s) [1] | Gel Time at 77° C. in Minutes |
|---|---|
| 6. Benzoyl peroxide (A) | 15.0 |
| 7. Methyl ethyl ketone peroxide (B) | 30.2 |
| 8. Tert-butyl peracetate (C) | 45.6 |
| 9. 80% A—20% B | 13.1 |
| 10. 50% A—50% B | 12.8 |
| 11. 50% B—50% C | 28.3 |
| 12. 50% C—50% A | 12.5 |
| 13. 20% C—80% A | 11.6 |
| 14. 20% A—20% B—60% C | 11.9 |
| 15. 20% A—60% B—20% C | 10.9 |
| 16. 63% A—27% B—10% C | 10.6 |
| 17. 60% A—20% B—20% C | 10.2 |
| 18. 33⅓% A—33⅓% B—33⅓% C | 9.6 |
| 19. 40% A—45% B—15% C | 9.3 |

[1] Total peroxidic oxygen of the initiators is approximately .063%. The amount of each initiator present in Examples 9–19, above, is expressed in terms of the amount of peroxidic oxygen contributed to the .063% total by that initiator.

Other per esters and ketone peroxides can be used with benzoyl peroxide in the systems of the invention to produce the described synergistic effect. Examples of such other per esters are tert-butyl perisobutyrate, tert-butyl perpropionate, tert-butyl percarbonate, and tert-butyl pervalerate; examples of such other ketone peroxides are dimethyl ketone peroxide, diethyl ketone peroxide and equivalent symmetrical and unsymmetrical alkyl-substituted ketone peroxides.

The sirups may be mixed with inert additives such as glass fibers, powdered metals, pigments, natural and synthetic materials; sheets may be made by pouring the sirup on a corrugated or flat surface before or after a fabric, metal or glass layer is placed on the surface; and the sirup may be used as a laminating layer for wood, plastic, and other surfaces. Subsequent to the aforesaid operations in matched metal molds, or by contact process, the sirup is polymerized under some pressure, e.g., 0.1 to 2000 p.s.i. and temperatures between room temperature and 150° C., to substantially 100% polymer or by any suitable molding process. For optimum properties, the products should be cured under elevated temperatures up to 125° C. and pressures up to 500 p.s.i. until the monomer content of the sirup has been reduced to a low level (preferably less than 1% based on polymer content). Where low pressures are used it is sometimes necessary to eliminate dissolved gases by evacuation of the sirup prior to use.

We claim:

1. A synergistic initiator system for the polymerization of partially polymerized methacrylic acid esters which comprises an initiator system consisting essentially of from 20% to 65% benzoyl peroxide, from 5% to 40% of a member of the group consisting of tert-butyl peracetate, tert-butyl perisobutyrate, tert-butyl perpropionate, tert-butyl percarbonate and tert-butyl pervalerate, and from 20% to 60% methyl ethyl ketone peroxide.

2. A synergistic initiator system for the polymerization of partially polymerized methacrylic acid esters which consist essentially of a member of the group consisting of benzoyl peroxide and lauroyl peroxide; combined with methyl ethyl ketone peroxide, said methyl ethyl ketone peroxide supplying from 20 to 50% of the total amount of peroxidic oxygen present.

References Cited in the file of this patent

UNITED STATES PATENTS

| | | |
|---|---|---|
| 2,566,206 | Hyman | Aug. 28, 1951 |
| 2,632,758 | Brothman | Mar. 24, 1953 |
| 2,661,363 | Dickey | Dec. 1, 1953 |
| 2,771,459 | Banes et al. | Nov. 20, 1956 |
| 2,779,702 | Wilson et al. | Jan. 29, 1957 |

UNITED STATES PATENT OFFICE
CERTIFICATE OF CORRECTION

Patent No. 3,113,114                          December 3, 1963

Robert Allen Maginn et al.

It is hereby certified that error appears in the above numbered patent requiring correction and that the said Letters Patent should read as corrected below.

Column 7, line 70, for the formula, "$(C_6H_5CO)_2O-O$" read -- $(C_6H_5CO)_2\underline{OO}$ --.

Signed and sealed this 21st day of April 1964.

(SEAL)
Attest:

ERNEST W. SWIDER                      EDWARD J. BRENNER
Attesting Officer                       Commissioner of Patents